United States Patent Office 3,796,662
Patented Mar. 12, 1974

3,796,662
EXTENDED LIFE FUNCTIONAL FLUID
Richard E. Lyle, El Cerrito, and Edward G. Foehr, San Rafael, Calif., assignors to Chevron Research Company, San Francisco, Calif.
No Drawing. Filed Feb. 17, 1972, Ser. No. 227,235
Int. Cl. C10m 1/32, 1/48
U.S. Cl. 252—32.7 E      7 Claims

ABSTRACT OF THE DISCLOSURE

Functional fluid lubricating oil compositions are provided which comprise (A) a major amount of an oil of lubricating viscosity, and (B) an effective amount of each of the following: (1) an alkyl succinimide, (2) a Group II metal salt of a dihydrocarbyl dithiophosphoric acid, (3) a tertiary amine selected from N-fatty alkyl-N,N-diethanol amines, N-fatty alkyl-N,N - di - ethoxyethanol amines, and N-fatty alkyl-N,N-di-poly-(ethoxy)ethanol amines, and (4) a Group II metal salt of a hydrocarbyl sulfonic acid. Such lubricating compositions are useful as functional fluids in systems requiring fluid coupling, hydraulic fluid and/or lubrication of relatively moving parts. The lubricating compositions of the invention are particularly useful as the functional fluid in automatic transmissions, particularly in passenger automobiles.

BACKGROUND OF THE INVENTION

Field of the invention

This invention relates to lubricating oil compositions, particularly to lubricating oil compositions useful as functional fluids in systems requiring fluid coupling, hydraulic fluid, and/or lubrication of relatively moving parts. In a preferred embodiment, this invention relates to a lubricating oil composition useful as the functional fluid in automatic transmissions, particularly automatic transmissions used in passenger automobiles.

The trend today is towards longer and longer periods of time between servicing of the modern passenger automobile. This trend includes servicing of the automatic transmission. Automobile manufacturers, for the convenience of their customers, are seeking to extend the time between fluid changes in the automatic transmission to greater and greater mileages.

Automatic transmission fluids are required to have a variety of desirable characteristics besides acting as a satisfactory fluid coupling or torque converter. Among these are allowing the transmission to shift smoothly, allowing the transmission to lock up during a shift from one speed to another within a certain specified period of time, and lubricating relatively moving parts such as bearing surfaces and clutch plates.

An automatic transmission is a complicated piece of machinery. It includes a turbine drive unit with a torque converter and one or more clutches which are engaged and disengaged automatically by an intricate hydraulic control unit. In a typical automatic transmission the clutches are made up of alternating steel plates and steel plates faced on both sides with a friction material such as compressed paper.

To achieve a smooth shift, the clutch plates are not abruptly engaged, but are compressed together at a controlled rate, with pressure varying with speed and torque. Therefore, for a finite measurable period of time, the friction facings and steel surfaces are in relative motion until complete engagement occurs. The time elapsed between when shifting begins and relative motion between the plates ceases is called the time to lock up.

This time to lock up is an important specification to be met in qualifying an automatic transmission fluid for use in the transmission of an automobile manufacturer. In order to not cause a great strain on the drive train and obtain a smooth shift, maximum and minimum times to lock up are specified.

The functional fluid used in automatic transmissions is subjected to very severe conditions of use. The temperature of the automatic transmission fluid under normal operating conditions will reach 275° F. Under more severe conditions, such as during climbing hills, trailer towing, stop-and-go traffic in the metropolitan areas, etc., the fluid temperature can increase significantly above this, up to, for example, 325° F. and higher. In addition, the fluid is constantly being pumped and agitated, thereby being brought into intimate contact with the atmosphere within the automatic transmission. Fresh air and atmospheric moisture are constantly introduced through the transmission housing breather tube. Under these conditions of high temperature and thorough mixing, the fluid tends to be oxidized, forming undesirable contaminants in the fluid, and modifying or impairing the desirable characteristics of the fluid.

The degradation products which are produced during use cause the characteristics of the functional fluid to change. The smoothness of the shift can be lost and the time it takes the transmission to lock up during a shift from one speed to another increases. As will be appreciated, when the lock-up time increases, the clutch facings are in relative motion to each other for a greater period of time, thereby allowing for the possibility of greater wear, higher clutch facing temperatures, and greater heat input to the fluid.

Eventually, the time to lock up will increase until it becomes too long to be acceptable. Prior to this point, the automatic transmission fluid must be changed to avoid permanent damage to clutches and/or bands.

In addition to the possibility of permanent damage to friction members, the degraded oil contains various contaminants which can either coagulate and settle out or plate out as a film throughout the transmission. This is particularly detrimental in the small passages and close fitting spool valves of the hydraulic control unit where a small amount of deposit can significantly change the size of the openings, cause sluggish valve movement thereby changing flow rates and pressures which, in turn, can markedly affect the performance of the entire transmission. In addition, should particles or lumps form in the fluid, they could completely block small openings such as in screens or filters and totally impair the function of the transmission.

DESCRIPTION OF THE PRIOR ART

The use of amines and amine salts including hydroxyalkyl amines in lubricating compositions is known. See Stuart and Lowe, U.S. Pat. 2,758,086. Lubricating oil compositions containing heterocyclic nitrogen-containing detergent polymers, oil-soluble salts of amino-imides of long-chain mono-substituted polymeric hydrocarbyl succinic anhydrides and thiophosphates are described in Henderson et al., U.S. Pat. 3,265,618. The use of metal salts of phosphorodithioic acid to improve the oxidative stability of lubricating compositions has been often disclosed. See, for example, Meinhardt, U.S. Pat. 3,347,790, and Rutherford et al., U.S. Pat. Re. 22,829. The combination of N,N-dialkyl aminoalkylene alkenyl succinimides and metal dithiophosphates are disclosed as being good detergent combinations in crankcase lubricating oils which prevent the formation of sludges and varnishes without contributing to the deposit of large amounts of ash in the combustion chamber are described in Anderson et al., U.S. Pat. 3,018,247. "Lubricating oil compositions suitable for use as automatic transmission fluids" are described in Butler et al., U.S. Pat. 3,396,109. These compositions, which contain the reaction product of a dihydrocarbyl phosphonodithioic acid with an amine, are described as oxidation inhibitors and antiwear agents. Lube oil compositions containing a basic alkaline earth metal petroleum sulfonates, a copolymer of C-vinyl pyridine and an alkyl methacrylate, and a succinimide of mono(polyolefin)succinic anhydride and a polyalkylene polyamine have been described as useful as turbine oils, gear oils, etc., in Henderson, U.S. Pat. 3,438,897. These compositions can optionally contain zinc dialkyl dithiophosphate.

SUMMARY OF THE INVENTION

The lubricating oil compositions of this invention comprise (a) a major amount of an oil of lubricating viscosity, and (b) an effective amount of each of the following: (1) an alkenyl succinimide, (2) a Group II metal salt of a dihydrocarbyl dithiophosphoric acid, (3) a tertiary amine selected from N-fatty alkyl-N,N-diethanolamines, N-fatty alkyl-N,N-di-ethoxyethanolamines and N-fatty alkyl-N,N-di-poly(ethoxy)ethanolamines, and (4) a Group II metal salt of a hydrocarbyl sulfonic acid. These lubricating oil compositions are useful as the functional fluids in systems requiring fluid coupling, hydraulic fluids and/or lubrication of relatively moving parts. These fluids are particularly valuable since their useful life is significantly greater than functional fluids currently available.

DESCRIPTION OF THE INVENTION

As described above, the extended life functional fluid compositions of this invention comprise a major amount of an oil of lubricating viscosity and an effective amount of each of an alkenyl succinimide, a Group II metal salt of a dihydrocarbyl dithiophosphoric acid, a tertiary amine, and a Group II metal salt of a hydrocarbyl sulfonic acid.

The alkenyl succinimide is present to, among other things, act as a dispersant and prevent formation of deposits formed during operation of the system containing the functional fluid. Alkenyl succinimides are well known. They are the reaction product of a polyolefin polymer-substituted succinic anhydride with an amine, preferably a polyalkenyl polyamine. The polyolefin polymer-substituted succinic anhydrides are obtained by the reaction of a polyolefin polymer or a derivative thereof with maleic anhydride. The succinic anhydride thus obtained is reacted with the amine. The preparation of the alkenyl succinimides has been described many times in the art. See, for example, U.S. Pat. 3,390,082, in cols. 2 through 6, wherein such a description is set forth. Many of the alkenyl succinimides prepared by the techniques set forth therein are suitable for use in the present invention.

Particularly good results are obtained with the lubricating oil compositions of this invention when the alkenyl succinimide is derived from a polyisobutene substituted succinic anhydride and a polyalkylene polyamine.

The polyisobutene from which the polyisobutene substituted succinic anhydride is derived is obtained from the polymerization of isobutene and can vary widely in its compositions. The average number of carbon atoms can range from 30 or less to 250 or more, with a resulting number average molecular weight of about 400 or less to 3,000 or more. Preferably, the average number of carbon atoms per polyisobutene molecule will range from about 50 to about 100 with the polyisobutenes having a number average molecular weight of about 600 to about 1,500. More preferably, the average number of carbon atoms per polyisobutene molecule ranges from about 60 to about 90, and the number average molecular weight ranges from about 800 to about 1,300. The polyisobutene is reacted with maleic anhydride according to well-known procedures to yield the polyisobutene substituted succinic anhydride.

The substituted succinic anhydride is reacted with a polyalkylene polyamine to yield the corresponding succinimide. Each alkylene radical of the polyalkylene polyamine usually has up to about 8 carbon atoms. The number of alkylene radicals can range up to about 8. The alkylene radical is exemplified by ethylene, propylene, butylene, trimethylene, tetramethylene, pentamethylene, hexamethylene, octamethylene, etc. The number of amino groups generally, but not necessarily, is one greater than the number of alkylene radicals present in the amine, i.e., if a polyalkylene polyamine contains 3 alkylene radicals, it will usually contain 4 amino radicals. The number of amino radicals can range up to about 9. Preferably, the alkylene radical contains from about 2 to about 4 carbon atoms and all amine groups are primary or secondary. In this case the number of amine groups exceeds the number of alkylene groups by 1.

Preferably, the polyalkylene polyamine contains from 3 to 5 amine groups. Specific examples of the polyalkylene polyamines include ethylenediamine, diethylenetriamine, triethylenetetramine, propylenediamine, tripropylenetetramine, tetraethylenepentamine, trimethylenediamine, pentaethylenehexamine, di-(trimethylene)-triamine, tri-(hexamethylene)tetraamine, etc.

Other amines suitable for preparing the alkenyl succinimide useful in this invention include the cyclic amines such as piperizine, morpholine and dipiperizines.

Preferably, the alkenyl succinimides used in the compositions of this invention have the following formula:

(I) 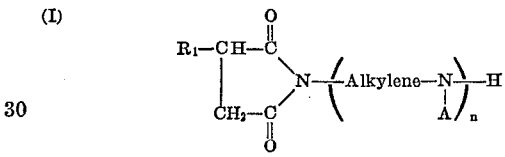

wherein:

(a) $R_1$ represents an alkenyl group, preferably a substantially saturated hydrocarbon derived from the polymerization of aliphatic mono-olefins. Preferably, $R_1$ is derived from isobutene and has an average number of carbon atoms and a number average molecular weight as described above.

(b) The "Alkylene" radical represents a substantially hydrocarbyl group containing up to about 8 carbon atoms and preferably containing from about 2–4 carbon atoms as described hereinabove.

(c) A represents a hydrocarbyl group, an amine-substituted hydrocarbyl group, or hydrogen. The hydrocarbyl group and the amine-substituted hydrocarbyl groups are generally the alkyl and amino-substituted alkyl analogs of the alkylene radicals described above. Preferably, A represents hydrogen.

(d) $n$ represents an integer of from about 1 to 10, and preferably from about 3–5.

The alkenyl succinimide is present in the lubricating oil compositions of the invention in an amount effective to act as a dispersant and prevent the deposit of contaminants formed in the oil during operation of the system containing the functional fluid. This effective amount can vary widely and is relatively high compared to the levels of alkenyl succinimide normally used in lubricating oils. For example, the amount of alkenyl succinimide can range from about 1.4 percent to about 4 percent weight of the total lubricating oil composition. Preferably, the amount of alkenyl succinimide present in the lubricating oil composition of the invention ranges from about 1.75 to about 2.25 percent by weight of the total composition.

As set forth above, the lubricating oil compositions of the invention contain a Group II metal salt of a dihydrocarbyl dithiophosphoric acid. One function of this salt is to act as an oxidation inhibitor thereby preventing the formation of a variety of oxygenated hydrocarbon products which impair the usefulness and shorten the useful life of the lubricating oil.

As stated above, the temperatures to which the functional fluids of automatic transmissions are subjected are often severe. Under these thermally severe conditions, not only is the lubricating oil quite prone to oxidation, but antioxidant additives quite often undergo thermal degradation. Accordingly, for a functional fluid to have an extended useful life, the oxidation inhibitor added to the lubricating oil must have good thermal stability at these relatively high temperatures, or its thermal degradation products must also exhibit antioxidation properties.

It has now been found that the above-mentioned Group II metal salts of dihydrocarbyl dithiophosphoric acids exhibit the antioxidant and thermal stability properties required for the severe service proposed. Group II metal salts of phosphorodithioic acids have been described previously. See, for example, U.S. Pat. 3,390,080, cols. 6 and 7, wherein these compounds and their preparation are described generally. Suitably, the Group II metal salts of the dihydrocarbyl dithiophosphoric acids useful in the lubricating oil composition of this invention contain from about 4 to about 12 carbon atoms, preferably from about 6 to about 12 carbon atoms, and most preferably 8 carbon atoms, in each of the hydrocarbyl radicals. The metals suitable for forming these salts include barium, calcium, strontium, zinc and cadmium, of which zinc is preferred.

Preferably, the Group II metal salt of a dihydrocarbyl dithiophosphoric acid have the following formula:

(II)
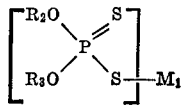

wherein:

(e) $R_2$ and $R_3$ each independently represent hydrocarbyl radicals as described above, and (f) $M_1$ represents a Group II metal cation as described above.

The dithiophosphoric salt is present in the lubricating oil compositions of this invention in an amount effective to inhibit the oxidation of the lubricating oil. This effective amount can vary widely and typically ranges from about 0.5 to about 1.5 percent by weight of the total composition, preferably the salt is present in an amount ranging from about 0.75 to about 1.0 percent by weight of the total lubricating oil composition.

The tertiary amine contained in the lubricating oil compositions of the invention principally acts as a friction modifier to give the lubricating oil the proper frictional characteristics. These frictional characteristics are particularly important where the functional fluid is to be used in automatic transmissions. The frictional properties of the oil are an important factor in how the oil lubricated clutch plates lock up during shifting. Each manufacturer of automatic transmissions specifies certain lock-up characteristics for the transmissions it manufactures. Various friction modifiers are introduced into the functional fluid to give the oil the proper characteristics to meet the "shift feel" requirements of various manufacturers. The friction modifiers contained in the lubricating oil compositions of the present invention are particularly suited to maintain the friction characteristics desired by General Motors Corporation over an extended service interval.

The tertiary amines of the lubricating oil of the present invention are selected from N-fatty alkyl-N,N-diethanol amines, N-fatty alkyl-N,N-di-ethoxy ethanolamines and N-fatty alkyl-N,N-di-poly(ethoxy)ethanolamines.

The fatty alkyl nitrogen substituent must be of sufficient length to make the amine oil soluble. Suitably, the fatty alkyl nitrogen substituent contains from 12 to 18 carbon atoms, which can be in a branched, but preferably are in a predominantly straight chain. The fatty alkyl moiety is conveniently obtained from naturally occurring substances containing the requisite length of alkyl chain. For example, the alkyl chain is suitably derived from substances such as coconut oil containing approximately 69–70 percent carbon chains having 12–14 carbon atoms. Suitably, also, the alkyl moiety can be derived from substances such as oleoamine containing predominantly alkyl chains having 18 carbon atoms. Preferably, the alkyl moiety is derived from coconut oil.

In a preferred embodiment of this invention, the tertiary amine has the following formula:

(III)
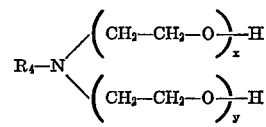

wherein:

(g) $R_4$ represents a fatty alkyl group containing from 12 to 18 carbon atoms, and (h) $x$ and $y$ each represent a positive whole integer greater than zero such that the sum of $x$ and $y$ represents a value of from 2 to 30.

As the sum of $x$ and $y$ increases, the oil solubility of the amine is reduced. Accordingly, it is preferred that the sum of $x$ and $y$ represents a value of from 2 to 15 and, more preferably, from 2 to 5. Most preferably, the sum of $x$ and $y$ represents 2.

As discussed above, the fatty alkyl group represented by $R_4$ can be derived from naturally occurring substances containing alkyl groups predominantly of the requisite lengths, preferably the fatty alkyl group represented by $R_4$ is derived from coconut oil.

The tertiary amines can be prepared by reacting the fatty alkyl amine with the appropriate number of moles of ethylene oxide. Tertiary amines derived from naturally occurring substances such as coconut oil and oleoamine are available from Armour Industrial Chemical Company under the trade name "Ethomeen." Particularly suitable compounds are those of the Ethomeen-C and Ethomeen-O series.

Generally, the proper shift feel is obtained when the composition contains from 0.05 to about 0.5 percent weight and preferably from about 0.1 to about 0.3 percent weight tertiary amine based on the total composition.

As stated above, the lubricating oil compositions of the invention contain a Group II metal salt of a hydrocarbyl sulfonic acid. One of the functions of this salt is to act as a detergent and dispersant. Among other things it prevents the deposit of contaminants formed during high temperature operation of the system containing the functional fluid.

The Group II metal salts of hydrocarbyl sulfonic acids are well known. Many of these salts have been used as additives to lubricating oil compositions. These salts comprise the neutralization product obtained by reacting a Group II metal base with the product obtained by treating a hydrocarbon oil with sulfuric acid. The resulting oil-derived sulfonic acid, when neutralized with the Group II metal compound, yields the sulfonate which forms part of the composition of this invention.

Several processes for preparing these sulfonates are briefly outlined in U.S. Pat. 2,395,713. Other processes are also discussed in U.S. Pat 2,388,677.

The hydrocarbon portion of the sulfonate used in the lubricating oil compositions of the invention is derived from a hydrocarbon oil stock or synthetic organic moieties such as alkylated aromatics. Being derived from such a material the hydrocarbon moiety is a mixture of different hydrocarbyl groups, the specific composition of which depends upon the particular oil stock which was used as the starting material. The fraction of the oil stock which becomes sulfonated is predominantly an aliphatic-substituted carbocyclic ring. The sulfonic acid group attaches to the carbocyclic ring. The carbocyclic ring is predominantly aromatic in nature, although a certain amount of the cycloaliphatic content of the oil stock will also be sulfonated. The aliphatic substituent of the carbocyclic ring effects the oil solubility and detergency properties of the sulfonate. Suitably, the aliphatic substituent contains from about 12 to about 30 carbon atoms, and preferably from about 20 to 25 carbon atoms. The aliphatic substituent can be a straight or branched chain and can contain a limited number of olefinic linkages, preferably less than 5 percent of the total carbon-to-carbon bonds are unsaturated.

The Group II metal cation of the sulfonate suitably is magnesium, calcium, strontium, barium, or zinc, and preferably is magnesium, calcium, or barium. Most preferably the Group II metal is calcium.

Preferably the Group I metal salt of a hydrocarbyl sulfonic acid has the following formula:

(IV)
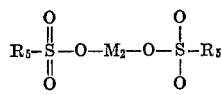

wherein:

(i) Each $R_5$ represents a hydrocarbyl group as described above, and (j) $M_2$ represents a Group II metal cation as described above.

The Group II metal salts of hydrocarbyl sulfonic acids are present in the lubricating oil compositions of the invention in an amount effective to prevent the deposit of contaminants formed in the oil during severe high temperature operation of the system containing the composition. This effective amount can vary widely and typically ranges from about 0.9 percent to about 1.8 percent weight, preferably from about 1.0 to about 1.4 percent weight of the total lubricating oil composition.

Automatic transmission fluids

In a preferred embodiment the compositions of this invention are particularly suited for use in automatic transmissions, particularly in passenger automobiles. Automatic transmission fluids generally have a viscosity in the range from about 75 to 1,000 SUS (Saybolt Universal Seconds) at 100° F. and from about 35 to 75 SUS at 210° F. The base oils for the automatic transmission fluids are light lubricating oils and ordinarily have a viscosity in the range of about 50 to 400 SUS at 100° F. and 33 to 50 SUS at 210° F. The base stock is a lubricating oil fraction of petroleum, either naphthenic or paraffinic base, unrefined, acid refined, hydrotreated, or solvent refined as required in the particular lubricating need. Also, synthetic oils meeting the necessary viscosity requirements, either with or without viscosity index improvers, may be used as the base stock.

To summarize, the various constituents will be present in the automatic transmission fluid as follows. The alkenyl succinimide used in this invention generally will be present in the functional fluid in from about 1.4 to about 4 percent weight, more usually from about 1.75 to about 2.25 percent weight. In concentrates prepared for addition to the base oil prior to use, the alkenyl succinimide can be present in from about 10 to about 35 weight percent. The Group II metal salt of a dihydrocarbyl dithiophosphoric acid will generally be present in the functional fluid in from about 0.5 to about 1.5 percent weight, more usually from about 0.75 to about 1.0 percent weight. The dithiophosphoric acid salts may be present in concentrates from about 5 to about 20 percent weight. The tertiary amines will generally be present in the functional fluid in from about 0.05 to about 0.5 percent weight, more usually from about 0.1 to about 0.3 percent weight. The amine may be present in concentrates in from about 1 to about 3 percent weight. The Group II metal salt of a hydrocarbyl sulfonic acid will generally be present in the functional fluid in from about 0.9 to about 1.8 percent weight, more usually from about 1.0 to about 1.4 percent weight. The sulfonic acid salt may be present in concentrates from about 5 to about 15 percent weight.

The functional fluid will normally contain a large number of other additives. It is usually necessary to heavily compound such oils in order to meet the exacting requirements specified.

Included among the other additives which can be used are additional oxidation inhibitors, such as, for example, the adduct obtained by combining terpene and phosphorous pentasulfide. Suitable materials are commercially available under the trade names Santolube and Hitec available from Monsanto Company and Edwin L. Cooper, Ltd., respectively.

Also commonly used in functional fluids are antifoam agents such as various fluorosilicone compounds commercially available. A particularly good antifoam agent is available from Dow Corning under the name FS 1265 Fluid.

Another useful functional fluid additive is a seal swell agent. A variety of compounds are useful for this function and include the bottoms product from catalytic cracking units used in the production of gasolines. These materials, containing a high percentage of condensed ring aromatics, are commercially available from Lubrizol Corporation under the name Lubrizol 725.

Also included in functional fluids are viscosity improving agents which are normally highly molecular weight polymers such as the acrylate polymers. Useful examples include the copolymers of alkyl methacrylate with vinyl pyrrolidine available under the tradename "Acryloid" from Rohm & Haas and terpolymers derived from styrene, alkylacrylates and nitrogen-containing polymer precursors available from Lubrizol Corporation under the name Lubrizol 3700 Series and methacrylates available from Texaco, Inc. Other viscosity improving agents include hydrocarbon polymers such as polyisobutylene or ethylene/propylene copolymers.

These additives will be present in the functional fluid in varying amounts necessary to accomplish the purpose for which they were included. For example, additional oxidation inhibitors such as the terpene-phosphorous pentasulfide adduct may be present in amounts ranging from about 0.1 percent to about 1 percent weight or more. The fluorosilicone antifoam agent, for example, will generally be present in from about 2 to about 50 p.p.m. The viscosity index improver will normally be present in from about 0.5 to about 15 percent by weight of the base oil, more usually from about 2 to about 10 percent by weight of the base oil. The seal swell agent will be present in an amount effective to control the size of the seals with which the functional fluid comes in contact. For example, the bottoms from the catalytic cracking unit will be present in an amount ranging from about 1 to about 10 percent, more usually from about 2 to about 5 percent weight.

Other additives include pour point depressants, antisquawk agents, etc. Numerous automatic transmission fluid additives are listed in U.S. Pats. Nos. 3,156,652 and 3,175,976, which disclosure is incorporated herein by reference.

These various additives are also often incorporated into the concentrates and will be present therein in correspondingly higher concentrations.

EXAMPLES

The following examples are offered by way of illustration and not by way of limitation.

Testing procedure

The functional fluids shown in Tables I and II below were tested under simulated use conditions according to the AT–12 or Low Energy Cycling Test (LECT) 1970 Re-Revision, specified by General Motors. Automatic transmission fluids approved for use in GM transmissions must pass this test.

The AT–12 test involves cycling a 350 cubic inch displacement General Motors engine driving a dynamometer-loaded Chevrolet Powerglide two-speed automatic transmission. Briefly, the cycle is as follows. The engine, operating at idle, is given a preset amount of throttle. Acceleration continues in "Lo" until the engine reaches about 3200 r.p.m. (elapsed time 7.8±0.1 seconds). The transmission shifts to "Drive" during which engine speed drops to about 2300 r.p.m. This preset throttle condition is maintained for a total of 30 seconds at which time output torque must be 230–235 foot pounds with input speed about 2300 r.p.m. and output speed about 1920 r.p.m. The throttle is then returned to the idle position for 10 seconds. Deceleration takes place and includes a downshift into "Lo." At the end of 10 seconds when engine speed has reached about 1100 r.p.m., the throttle is opened and the cycle is repeated.

This cycled test is continued 24 hours per day, generally interrupted only by mechanical difficulties, a shutdown for 24 hours at about 150 test hours, and weekend layovers. The time to lockup during the shift from Lo to Drive is measured regularly. Initial lockup time must be in the range of 0.375 to 0.6 second. The useful life of the fluid is considered spent when lock-up time exceeds 0.80 second. Current standards set by General Motors require the 0.80-second lock-up time not be reached for at least 225 hours.

TABLE I.—AT-12 AUTOMATIC TRANSMISSION TEST BASE OIL—EASTERN STOCK [12]

| Run number | A | B | C | D | E | F | G |
|---|---|---|---|---|---|---|---|
| Component: | | | | | | | |
| Viscosity improved,[1] percent w.[10] | | | | | 4.0 | | |
| Do.[2] | 4.0 | 4.0 | 4.0 | 4.0 | | 4.0 | 4.0 |
| Alkenyl succinimide,[3] percent w | 3.3 | 3.3 | 4.0 | 4.0 | 4.0 | 4.0 | 4.0 |
| Zinc dioctyldithiophosphate,[4] mM./kg. | 7 | 10 | 10 | 10 | 10 | 10 | 10 |
| Calcium sulfonate,[5] mM./kg | 8 | 8 | 8 | 8 | 8 | 8 | 8 |
| Fatty alkyl diethanol amine,[6] percent w | 0.2 | 0.2 | 0.2 | 0.2 | 0.2 | 0.2 | 0.2 |
| Antifoam agent,[7] p.p.m | | | 5 | 15 | 15 | 15 | 15 |
| Seal swell agent,[8] percent w | | | | | | | 3.5 |
| Do.[9] | 3.5 | | 3.5 | 3.5 | 3.5 | 3.5 | |
| Hours to 0.60 sec. lock-up | 341 | 364 | 418 | [11] 475 | 345–375+ | 395 | 430 |
| Hours to 0.80 sec. lock-up | 354 | 381 | 436 | | 360–381 | | |

[1] A commercially available alkylmethacrylate/vinylpyrrolidine copolymer, contains 0.2% nitrogen.
[2] A commercially available styrene/alkylacrylate/nitrogen containing polymer precursor terpolymer.
[3] An alkenyl succinimide derived by reacting a polyisobutene (number average molecular weight about 950) substituted succinic anhydride with tetraethylenepentamine; mole ratio of amine to anhydride=0.87.
[4] Derived from mixed primary octanols.
[5] A neutral calcium salt of a hydrocarbyl sulfonic acid prepared from a neutral lubricating oil.
[6] Fatty alkyl group derived from coconut oil.
[7] A commercially available fluorosilicon.
[8] A commercially available aromatic petroleum cycle stock from catalytic cracking.
[9] A commercially available hydrocarbon obtained as a bottoms cut from the stream from a catalytic cracking unit used to produce gasoline; predominately condensed ring aromatic compounds.
[10] All percentages are percent weight of final composition.
[11] 475 hours to 0.45 second lock-up time.
[12] Eastern base oil viscosity 109 SUS at 100° F., 40 SUS at 210° F.

TABLE II.—AT-12 AUTOMATIC TRANSMISSION TEST BASE OIL—WESTERN STOCK[1]

| Run number | H | I | J |
|---|---|---|---|
| Component: | | | |
| Viscosity improver,[2] percent w | 4.0 | 4.0 | 4.0 |
| Alkenyl succinimide,[3] percent w | 4.0 | 4.0 | 4.0 |
| Zinc dioctyldithiophosphate,[4] mM./kg. | 10 | 10 | 15 |
| Calcium sulfonate,[5] mM./kg | 8 | 8 | 8 |
| Fatty alkyl diethanol amine,[6] percent w | 0.2 | 0.2 | 0.2 |
| Antifoam agent,[7] p.p.m | 5 | | |
| Antioxidant,[8] percent w | 0.25 | | |
| Hours to 0.80 second lock-up | 356 | ([9]) | 344 |

[1] Contains more naphthenic compounds than the eastern base stock.
[2,3,4,5,6,7] See number footnotes, Table I.
[8] Commercial available product obtained by combining terpene and phosphorus pentasulfide.
[9] 358 hours to 0.73 sec. lock-up time.

The above data demonstrate the long useful life of the functional fluids of this invention when placed in service in passenger automobile automatic transmissions. The useful life of the functional fluids tested above in the very severe AT-12 test exceeded the useful life specified by General Motors for such fluids to be used in transmissions manufactured by that company by from 150 to over 220 percent. This greatly extended useful life will allow greater oil drain intervals and thereby reduced operating costs for the owner of the vehicle.

While the invention has been described in detail and with reference to specific embodiment, it will be obvious other variations and embodiments can be effected within the spirit and scope of the appended claims.

We claim:
1. A lubricating oil composition which comprises:
(A) a major amount of an oil of lubricating viscosity, and
(B) an effective amount of each of the following:
   (1) an alkenyl succinimide,
   (2) a Group II metal salt of a dihydrocarbyl dithiophosphoric acid,
   (3) a tertiary amine selected from N-fatty alkyl-N,N - diethanolamines, N - fatty alkyl-N,N-diethoxyethanol amines and N-fatty alkyl-N,N-dipoly(ethoxy)ethanol amines, and
   (4) a Group II metal salt of a hydrocarbylsulfonic acid.

2. A lubricating oil composition of claim 1 wherein (1) the imide substituent of said succinimide is derived from a polyalkylene polyamine and said alkenyl substituent of said succinimide is derived from polyisobutene, (2) said hydrocarbyl groups of said dithiophosphoric acid contain from 4 to 12 carbon atoms, (3) said fatty alkyl group of said tertiary amine contains from 12 to 18 carbon atoms, and (4) said Group II metal of said Group II metal salt of a hydrocarbylsulfonic acid is magnesium, calcium or barium.

3. A lubricating oil composition of claim 1 wherein:
(1) said alkenyl succinimide has the following formula:

$$R_1-CH-\overset{O}{\underset{\|}{C}}\diagdown N-(\text{Alkylene}-N)_n-H \diagup \underset{\|}{\overset{\|}{C}}\diagup A$$
$$CH_2-\overset{O}{\underset{\|}{C}}$$

wherein:
(a) $R_1$ represents an alkenyl group,
(b) the "alkylene" radical contains from 1 to 8 carbon atoms,
(c) A represents a hydrocarbyl group, an amine-substituted hydrocarbyl group or hydrogen, and
(d) $n$ represents an integer of from 1 to 10;
(2) said dithiophosphoric acid salt has the following formula:

(II) $$\left[\begin{array}{c}R_2O\diagdown \;\;\diagup S \\ \;\;\;\;\;P \\ R_3O\diagup \;\;\diagdown S\end{array}\right]_2-M_1$$

wherein:
(e) $R_2$ and $R_3$ each independently represent hydrocarbyl radicals, and
(f) $M_1$ represents a Group II metal cation;

(3) said tertiary amine has the following formula:

(III)
$$R_4-N \begin{pmatrix} (CH_2-CH_2-O)_x-H \\ (CH_2-CH_2-O)_y-H \end{pmatrix}$$

wherein:
(g) $R_4$ represents a fatty alkyl group containing from 12 to 18 carbon atoms, and
(h) $x$ and $y$ each represent a positive whole integer greater than zero such that the sum of $x$ and $y$ represents a value of from 2 to 30; and (4) said Group II metal salt of a hydrocarbylsulfonic acid has the following formula:

(IV)
$$R_5-\overset{O}{\underset{O}{S}}-O-M_2-O-\overset{O}{\underset{O}{S}}-R_5$$

wherein:
(i) each $R_5$ represents a hydrocarbyl group,
(j) $M_2$ represents a Group II metal cation.

4. A lubricating oil composition of claim 3 wherein:
(a) $R_1$ represents an alkenyl group derived from polyisobutene,
(b) said alkylene radical contains from 2 to 4 carbon atoms,
(c) A represents hydrogen,
(d) $n$ represents 3, 4 or 5,
(e) $R_2$ and $R_3$ each represent a hydrocarbyl radical containing from 4 to 12 carbon atoms,
(f) $M_1$ represents zinc,
(g) $R_4$ represents a fatty alkyl group containing from 12 to 18 carbon atoms,
(h) $x$ and $y$ each represent 1, 2, or 3, and
(i) $M_2$ represents magnesium, calcium or barium.

5. A lubricating oil composition of claim 4 wherein:
(a) said alkylene radical contains two carbon atoms,
(b) $n$ represents 4,
(c) $R_2$ and $R_3$ each represent a hydrocarbyl radical containing 8 carbon atoms,
(d) $R_4$ represents a fatty alkyl group derived from coconut oil containing predominantly from 12 to 14 carbon atoms, and
(e) $x$ and $y$ each represent 1,
(f) $M_2$ represents calcium.

6. A lubricating oil composition of claim 5 wherein said composition contains:
(1) from 1.4 to 4 percent weight of said alkenyl succinimide,
(2) from 0.5 to 1.5 percent weight of said dithiophosphoric acid salt,
(3) from 0.05 to 0.5 percent weight of said tertiary amine, and
(4) from 0.9 to 1.8 percent weight of said Group II metal salt of a hydrocarbylsulfonic acid.

7. A lubricating oil composition of claim 6 wherein said composition contains
(1) from 1.75 to 2.25 percent weight of said alkenyl succinimide,
(2) 0.75 to 1.0 percent weight of said dithiophosphoric acid salt,
(3) from 0.1 to 0.3 percent weight of said tertiary amine, and
(4) from 1.0 to 1.4 percent weight of said Group II metal salt of a hydrocarbylsulfonic acid.

References Cited
UNITED STATES PATENTS 3,634,256   5/1969   Bickham _____ 252—51.5 A
3,445,386   5/1969   Otto et al. _____ 252—32.7 E WERTEN F. W. BELLAMY, Primary Examiner U.S. Cl. X.R.

252—74, 51.5 A